E. M. DEMPSEY.
FAUCET.
APPLICATION FILED MAY 8, 1918.
1,336,026.
Patented Apr. 6, 1920.
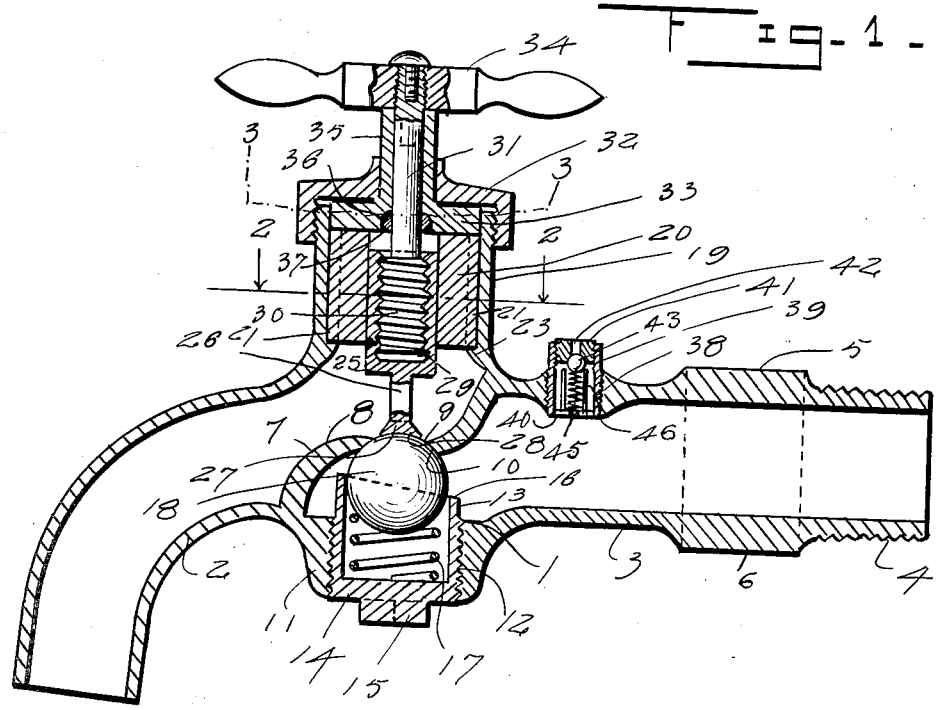
Fig. 1.
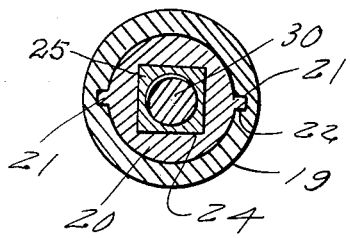
Fig. 2.
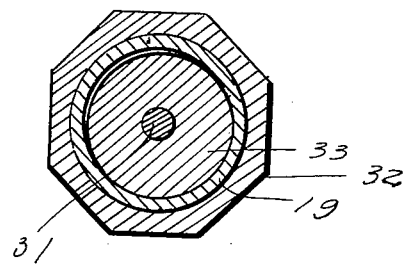
Fig. 3.
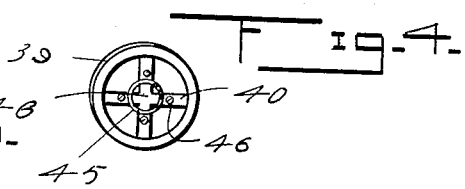
Fig. 4.
Fig. 5. Fig. 6.
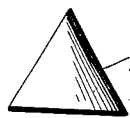
Inventor
E. M. Dempsey,
By
Attorney

UNITED STATES PATENT OFFICE.

EDWARD M. DEMPSEY, OF SIDNEY, OHIO.

FAUCET.

1,336,026.        Specification of Letters Patent.        Patented Apr. 6, 1920.

Application filed May 8, 1918. Serial No. 233,332.

*To all whom it may concern:*

Be it known that I, EDWARD M. DEMPSEY, a citizen of the United States, residing at Sidney, in the county of Shelby and State of Ohio, have invented certain new and useful Improvements in Faucets; and I do hereby declare the following to be a full, clear, and exact description of the invention, such as will enable others skilled in the art to which it appertains to make and use the same.

This invention relates to improvements in faucets and valves, and one of its objects is the provision of a novel device of this character which will not require the use of packing or gaskets to establish a water tight connection between its valve and valve seat, which shall be noiseless, and which shall be capable of withstanding the maximum pressure and extreme hot and cold water.

A further object of the invention is the provision of a faucet or valve of the above stated character which will automatically admit air to the pipes of a water supply system when the waste outlet of a stop and waste valve of the system is opened, whereby to permit all of the water to quickly drain from the system through the stop and waste valve.

A still further object of the invention is the provision of a faucet or valve of the above stated character which shall be simple, durable and efficient, and which may be manufactured and sold at a comparatively low cost.

With the above and other objects in view, the invention consists in the construction, combination and arrangement of parts hereinafter fully described and claimed, and illustrated in the accompanying drawing, wherein:

Figure 1 is a sectional view of a faucet constructed in accordance with my invention, the section being taken on a vertical plane extending centrally and longitudinally through the faucet.

Fig. 2 is a sectional view taken on the horizontal plane indicated by the line 2—2 of Fig. 1, looking in the direction indicated by the arrows.

Fig. 3 is a section taken on the horizontal plane indicated by the line 3—3 of Fig. 1.

Fig. 4 is a detail top plan view of the cage of the air vent valve.

Figs. 5 and 6 are modified forms of the valve.

Referring to the drawing by reference numerals, 1 designates the body, 2 the bib and 3 the nipple of the faucet. The nipple 3 is provided with screw threads 4 to permit the faucet to be connected to a fitting, and to permit of the use of a wrench in applying or removing the faucet, the nipple is provided with a centrally located enlarged or thickened portion 5 having an angular perimeter 6. A partition 7 is located within the body 1, and has its horizontal portion 8 provided with an opening 9 to permit water to pass from the nipple 3 through the body 1 and out through the bib 2. The wall of the opening 9 is formed to provide a downwardly facing valve seat 10 which is curved in cross section.

At a point directly beneath the valve seat 10, the body 1 is provided with a downwardly projecting extension 11 which has an opening extending vertically therethrough. The opening is larger in diameter than the diameter of the valve seat 10 and its wall is provided with screw threads 12. A valve cage 13 is threadedly mounted in the extension 11 and is of hollow cylindrical formation. Its upper end is fully open, and its lower closed end 14 is provided with an angular wrench engaging lug 15. The upper edge 16 of the valve cage 13 inclines upwardly and forwardly. Mounted within the valve cage 13 upon a compression spring 17 is a spherical valve 18 which is normally held against the seat 10 by the spring. The valve 18 may be constructed of bronze, brass or any other metal suitable for the purpose, and in view of its formation and the formation of the valve seat 10 it will when seated effectively close the faucet.

At a point above the opening 9 and in alinement therewith, the body 1 is provided with an upwardly extending cylindrical projection 19, the diameter of which is considerably greater than that of the opening 9. A cylindrical bushing 20 is located within the extension 19, and it is provided at diametrically opposite points with radially extending ribs 21 which fit in grooves 22 formed in the inner wall of the extension 19 and which rests upon shoulders 23 formed at the lower ends of the grooves 22. These ribs support the bushing 20 within the extension 19, and prevent it from having any rotative movement with relation to the bushing. A rectangular opening or passage 24 extends vertically and centrally through the bushing 20, and slidably mounted therein is the enlarged upper rectangular portion 25 of a valve operating rod 26. This portion has a close sliding fit with the opening or passage 24 so as to prevent it from having any rotative movement with relation to the bushing 20. The lower end of the valve operating rod 26 is enlarged, and such end is provided with a concave valve engaging surface 28. The portion 25 is provided with a hollow cylindrical bore 29 which has its side wall screw threaded for coöperation with the screw threaded end 30 of a stem 31. The stem 31 extends upwardly through a bonnet nut 32 threaded to the upper end of the extension 19, and has secured to its upper end a handle 34. A disk 33 rests upon the upper end of the bushing 20 and is retained in place by the bonnet nut 32. A sleeve 35, which surrounds the stem 31, extends upwardly through the bonnet nut 32 and is formed at its lower end with the disk 33. In its under side about the stem 31, the disk 33 is provided with a recess 36 for the reception of an annular shoulder 37 formed upon the stem 31. The shoulder 37 and the handle 34, which latter engages the upper end of the sleeve 35, hold the stem 31 against endwise movement. By reason thereof, and as the rod 26 is held against rotary movement, a rotary motion imparted to the stem 31 through the medium of the handle 34 will impart a sliding movement to the rod 26.

When it is desired to unseat the valve 18, the handle 34 is turned in one direction, and when it is desired to permit the valve to be seated by the spring 17, the handle is turned in the reverse direction.

At a point in rear of the partition 7, the nipple 3 is provided with an opening 38 in which a valve cage 39 of hollow cylindrical formation is threadedly mounted. At its lower end, the cage 39 is provided with a spider 40, and at its upper end it is provided with a plug 41 which has an opening 42 extending vertically therethrough. The lower end of the opening 42 is enlarged to provide a valve seat 43. The opening 42 is normally closed by a spherical valve 44 which is held against the seat 43 by a spring 45. The spring 45 rests upon the spider 40, and the valve 44 is guided in its movements toward and away from the seat 43 by rods 46 which are carried by the spider 40. The rods surround the spring 45, and maintain it in an upright position and insure the prompt and proper return of the valve 44 to its seat 43.

When the water system of which the faucet forms a part is drained by the operation of the usual stop and waste valve, the valve 44 will be unseated by air pressure and permit air to enter the system through the nipple 3, whereby to insure the prompt draining of all water from the system. The valve seat 10 may be formed to permit the use of a cone shaped valve 18$^a$ or the use of a wedge shaped valve 18$^b$. These valves are illustrated in Figs. 5 and 6 of the drawings, respectively.

While I have shown and described the preferred embodiment of my invention, it will be understood that minor changes in the construction, combination and arrangement of parts may be made without departing from the spirit and scope of the invention as defined by the claims.

Having thus fully described my invention, what I claim as new and desire to secure by Letters Patent, is:

1. A faucet or valve comprising a body provided with a partition having an opening, a valve seat formed about the opening, a valve coöperating with said seat, a spring yieldingly retaining the valve in engagement with the seat, a hollow extension formed on the body, a bushing located within the extension and provided with a rectangular opening, a rod having a rectangular end slidably arranged in said opening and provided with a screw threaded bore, the other end of the rod being arranged in engagement with the valve, a disk secured in said extension and provided with a sleeve projecting beyond said extension, and a stem rotatably mounted in said sleeve and provided with a screw threaded end engaging in said socket.

2. A faucet or valve comprising a body provided with a partition having an opening, a valve seat formed in the under side of the partition about the opening therein, a valve coöperating with said seat, a spring yieldingly retaining the valve in engagement with the seat, a hollow extension formed on the upper side of the body, a bushing removably mounted in said extension, a rod slidably mounted in the bushing and having its upper end provided with a screw threaded socket and having its lower end engaging the valve, means closing the upper end of the extension and engaging the upper end of the bushing, a stem rotatably mounted in said means and having its lower end threaded and engaging in the socket, said means having a bearing in its under side about the stem, and a shoulder on the stem fitting in said bearing.

3. A faucet or valve comprising a body provided with a partition having an opening, a valve seat formed on the under side of the partition about the opening therein, a valve coöperating with the seat, a spring yieldingly retaining the valve in engagement with the seat, a hollow extension formed on the upper side of the body and having a shoulder and grooves located above said shoulder, a bushing removably mounted in the extension upon the shoulder and provided with ribs fitting in the grooves, a rod slidably mounted in the bushing and having its upper end provided with a screw threaded socket and having its lower end engaging said valve, means closing the upper end of the extension and engaging the upper end of the bushing, a stem rotatably mounted in the means and having its lower end threaded and engaging in the socket, said means having a bearing in its under side about the stem, and a shoulder on the stem engaging in the bearing.

In testimony whereof I affix my signature in presence of two witnesses.

EDWARD M. DEMPSEY.

Witnesses:
W. C. HORME,
E. E. JOFFER.